(12) United States Patent
Cheng et al.

(10) Patent No.: US 12,348,568 B1
(45) Date of Patent: Jul. 1, 2025

(54) METHODS FOR OPTIMIZING SELECTION OF A HARDWARE SECURITY SERVER AND DEVICES THEREOF

(71) Applicant: F5, Inc., Seattle, WA (US)

(72) Inventors: Liang Cheng, Seattle, WA (US); Saxon C. Amdahl, Seattle, WA (US)

(73) Assignee: F5, Inc., Seattle, WA (US)

( * ) Notice: Subject to any disclaimer, the term of this patent is extended or adjusted under 35 U.S.C. 154(b) by 128 days.

(21) Appl. No.: 18/087,955

(22) Filed: Dec. 23, 2022

(51) Int. Cl.
*H04L 9/40* (2022.01)
*H04L 43/04* (2022.01)
*H04L 43/0805* (2022.01)

(52) U.S. Cl.
CPC .............. *H04L 63/20* (2013.01); *H04L 43/04* (2013.01); *H04L 43/0805* (2013.01)

(58) Field of Classification Search
CPC .......................... G06F 16/248; G06F 16/24534
See application file for complete search history.

(56) References Cited

U.S. PATENT DOCUMENTS

| | | | | |
|---|---|---|---|---|
| 8,566,932 | B1 * | 10/2013 | Hotta .................... | G06F 21/567 726/22 |
| 8,584,247 | B1 * | 11/2013 | Patil ..................... | G06Q 10/101 726/4 |
| 8,868,726 | B1 * | 10/2014 | Tu ........................ | G06F 11/1461 709/224 |
| 11,256,553 | B2 * | 2/2022 | Janakiraman ........... | G06F 9/505 |

(Continued)

FOREIGN PATENT DOCUMENTS

| | | | | |
|---|---|---|---|---|
| CN | 111935289 | A * | 11/2020 | ............. G06F 21/64 |
| EP | 3780485 | A1 | 2/2021 | |

(Continued)

OTHER PUBLICATIONS

International Search Report dated Feb. 29, 2024 issued in International Application No. PCT/US2023/083100.

(Continued)

*Primary Examiner* — David R Lazaro
*Assistant Examiner* — Mariegeorges A Henry
(74) *Attorney, Agent, or Firm* — Troutman Pepper Locke LLP

(57) ABSTRACT

Methods, non-transitory computer readable media, network traffic manager apparatuses, and systems that assist with optimizing selection from hardware security servers includes receiving data from candidate hardware security servers after sending an operation status request or a capability query to the candidate hardware security servers. The hardware security requirements can comprise of one or more server operation rules. Then, generating compliance scores for the candidate hardware security servers based on hardware security server requirements, built-in hardware security server requirements, and received data from the candidate hardware security servers. The method can then include generating a rank for the candidate hardware security servers based on the compliance scores of the candidate hardware security servers and providing the hardware security server recommendation for one of the candidate hardware security servers to the client based on the generated rank of the candidate hardware security servers with compliance scores above a predetermined threshold.

20 Claims, 5 Drawing Sheets

(56) References Cited

U.S. PATENT DOCUMENTS

| | | | |
|---|---|---|---|
| 2001/0037358 A1 | 11/2001 | Clubb et al. | |
| 2011/0173303 A1 | 7/2011 | Rider | |
| 2018/0124078 A1* | 5/2018 | Hajmasan | H04L 63/1408 |
| 2019/0305951 A1 | 10/2019 | Grubin | |
| 2020/0162580 A1 | 5/2020 | Suresh | |
| 2021/0279112 A1* | 9/2021 | Janakiraman | H04L 67/1097 |
| 2022/0417276 A1* | 12/2022 | Okutani | H04L 63/1433 |

FOREIGN PATENT DOCUMENTS

| | | | |
|---|---|---|---|
| FR | 2945644 A1 * | 11/2010 | G06F 11/1076 |
| WO | 2019212773 A1 | 11/2019 | |

OTHER PUBLICATIONS

International Search Report dated Feb. 20, 2024 issued in International Application No. PCT/US2023/083097.
Office Action dated Jun. 12, 2024 issued in Taiwanese Application No. 112149276.

* cited by examiner

METHODS FOR OPTIMIZING SELECTION OF A HARDWARE SECURITY SERVER AND DEVICES THEREOF

FIELD

This technology relates to methods and systems for optimizing selection of a hardware security server.

BACKGROUND

A hardware security server proxy can provide a single interface to a user on the front-end, while implementing a number of implementations to a plurality of hardware security server(s) on the back-end. The problem with hardware security servers is that different vendors or providers have hardware security servers with different capabilities. There is a challenge picking the appropriate hardware security server for a given client due to the different capabilities of each hardware security servers. For example, a client may be deployed in one location, and some of the hardware security servers may be closer than others to the client location.

In this example, perhaps one of the hardware security servers, while it may be farther away than other hardware security servers, it may be able to better support other needs or requirements of the client. In this scenario, and other similar scenarios, selecting a recommended hardware security server may be difficult.

SUMMARY

A method for optimizing selection of a hardware security server for a given client, implemented in cooperation with a cloud service or a network traffic management system comprising one or more network traffic management modules, server modules, or client modules, includes receiving data from candidate hardware security servers after sending an operation status request or a capability query to the candidate hardware security servers. The hardware security requirements can comprise of one or more server operation rules. Then, generating compliance scores for the candidate hardware security servers based on hardware security server requirements, built-in hardware security server requirements, and received data from the candidate hardware security servers. The method can then include generating a rank for the candidate hardware security servers based on the compliance scores of the candidate hardware security servers and providing the hardware security server recommendation for one of the candidate hardware security servers to the client based on the generated rank of the candidate hardware security servers with compliance scores above a predetermined threshold.

A network traffic management apparatus including memory including programmed instructions stored thereon and one or more processors configured to be capable of executing the stored programmed instructions to optimize selection from hardware security servers includes receiving data from candidate hardware security servers after sending an operation status request or a capability query to the candidate hardware security servers. The hardware security requirements can comprise of one or more server operation rules. Then, generating compliance scores for the candidate hardware security servers based on hardware security server requirements, built-in hardware security server requirements, and received data from the candidate hardware security servers. The executed instructions can then generate a rank for the candidate hardware security servers based on the compliance scores of the candidate hardware security servers and providing the hardware security server recommendation for one of the candidate hardware security servers to the client based on the generated rank of the candidate hardware security servers with compliance scores above a predetermined threshold.

A non-transitory computer readable medium having stored thereon instructions for including executable code that, when executed by one or more processors, causes the processors to optimize selection from hardware security servers includes receiving data from candidate hardware security servers after sending an operation status request or a capability query to the candidate hardware security servers. The hardware security requirements can comprise of one or more server operation rules. Then, generating compliance scores for the candidate hardware security servers based on hardware security server requirements, built-in hardware security server requirements, and received data from the candidate hardware security servers. The processors can then generate a rank for the candidate hardware security servers based on the compliance scores of the candidate hardware security servers and providing the hardware security server recommendation for one of the candidate hardware security servers to the client based on the generated rank of the candidate hardware security servers with compliance scores above a predetermined threshold.

A network traffic management system includes one or more traffic management modules, server modules, or client modules, memory comprising programmed instructions stored thereon, and one or more processors configured to be capable of executing the stored programmed instructions to optimize selection from hardware security servers includes receiving data from candidate hardware security servers after sending an operation status request or a capability query to the candidate hardware security servers. The hardware security requirements can comprise of one or more server operation rules. Then, generating compliance scores for the candidate hardware security servers based on hardware security server requirements, built-in hardware security server requirements, and received data from the candidate hardware security servers. The executed instructions can then generate a rank for the candidate hardware security servers based on the compliance scores of the candidate hardware security servers and providing the hardware security server recommendation for one of the candidate hardware security servers to the client based on the generated rank of the candidate hardware security servers with compliance scores above a predetermined threshold.

This technology provides a number of advantages including providing methods, non-transitory computer readable media, network traffic management apparatuses, and network traffic management systems that help optimize selection of a hardware security server. This technology allows for the comparison of various capabilities of a plurality of hardware security servers against requirements needed for a hardware security server recommendation. Additionally, this technology advantageously provides a method of selecting backup hardware security servers that can be used if a hardware security server is unavailable.

DETAILED DESCRIPTION

The proposed technology relates to a method for optimizing selection of a hardware security server for a given client. This technology solves the problem by measuring and scoring the various capabilities of the hardware security servers to determine the recommended hardware security server.

The proposed technology can also mask back-end faults from the user infrastructure on the front-end of the hardware security server proxy, by selecting the most matching hardware security server as a redundant unit for a live key migration in order to facilitate overall high availability. In some examples, because the hardware security proxy is connected to the plurality of hardware security servers on the back-end, if any of the hardware security servers becomes unavailable, the hardware security server proxy is able to select an alternate hardware security server where critical information has already been replicated. This allows a user to increase the hardware security server availability to the user infrastructure.

Figure 1:
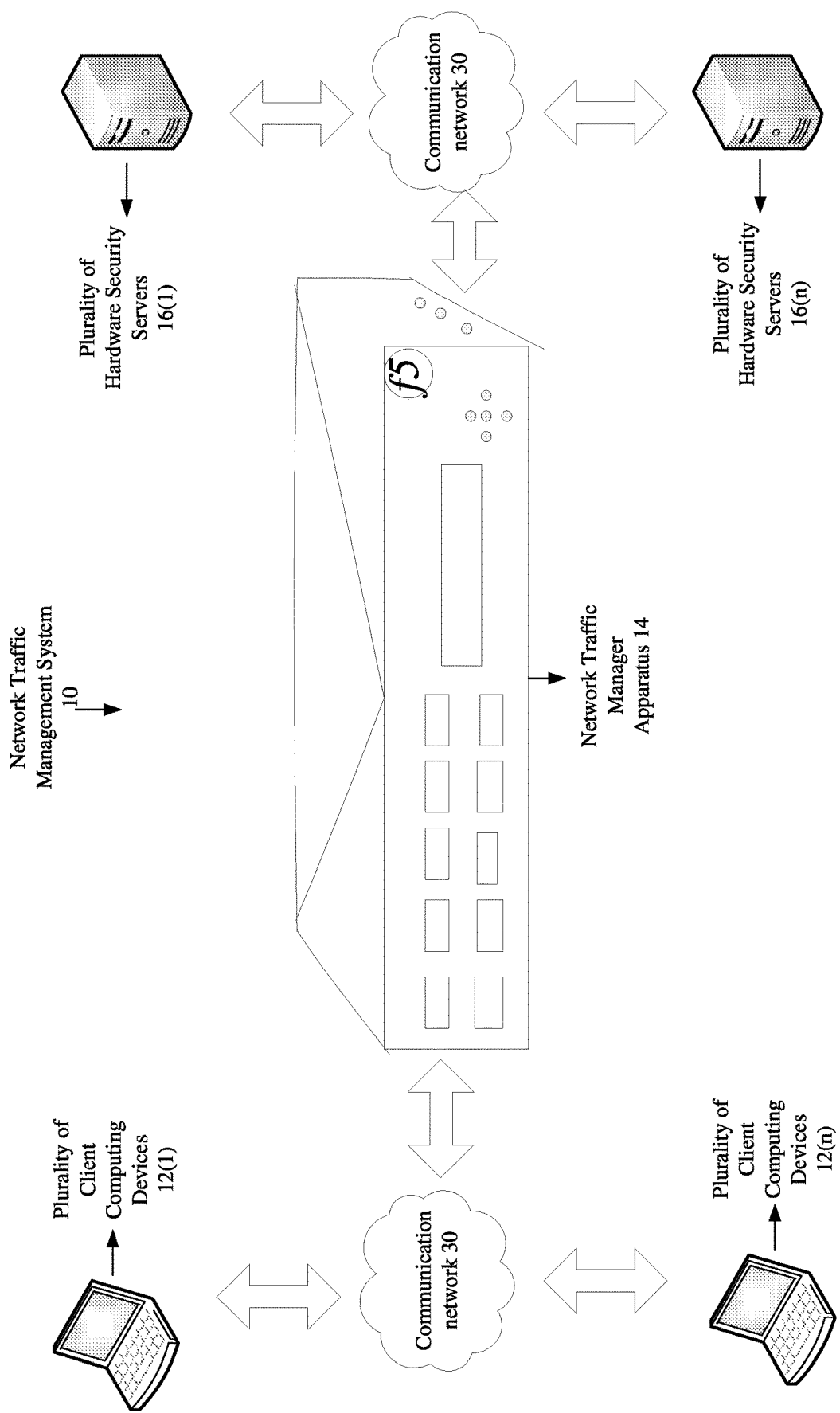
FIG. 1 are block diagrams of an exemplary network traffic management system with a network traffic management apparatus.
Figure 2:
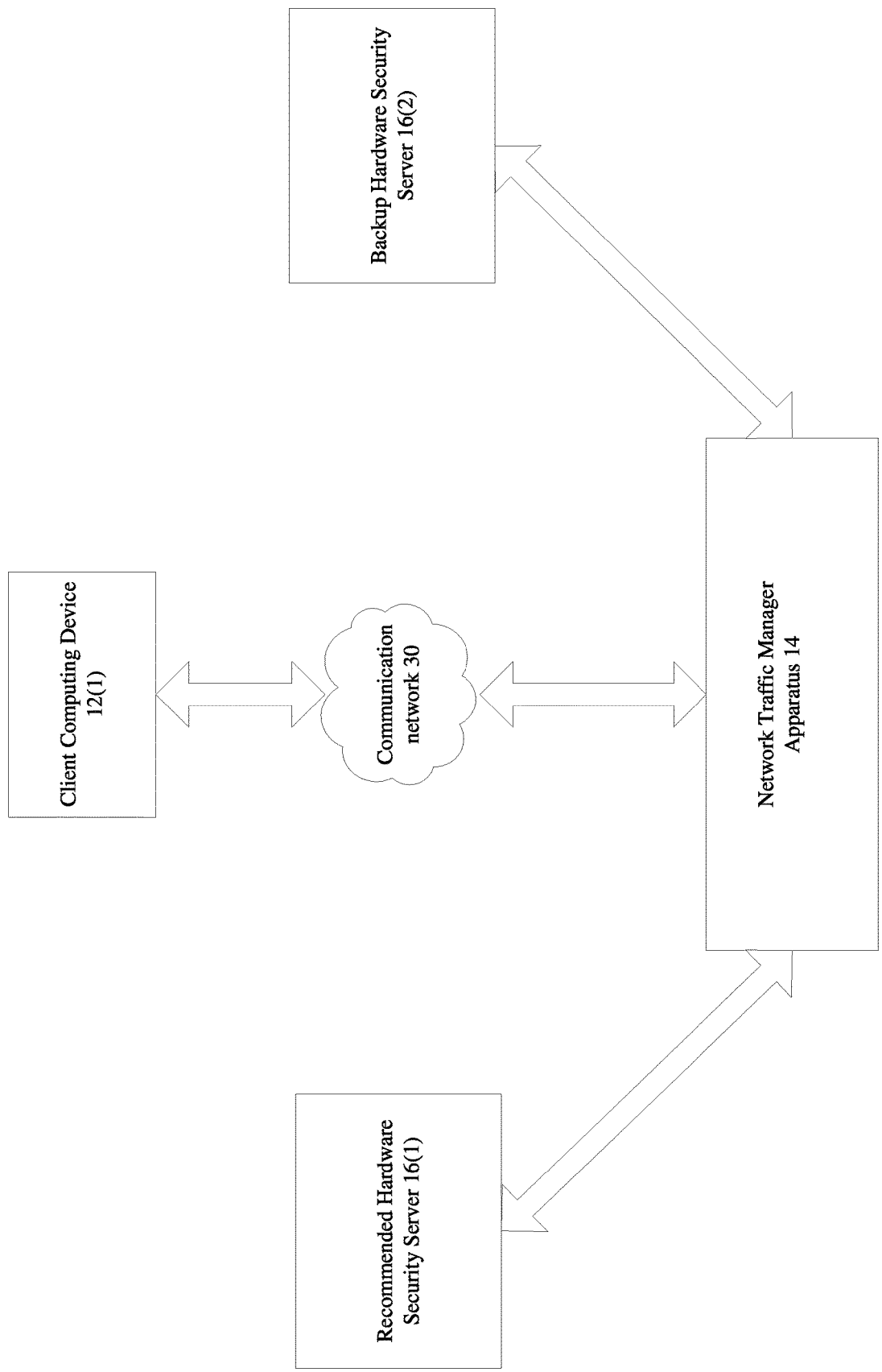
FIG. 2 is a block diagram of an exemplary network traffic manager apparatus.

An example of the proposed technology includes a network environment 10 which incorporates a network traffic management system for optimizing selection of a hardware security server with a network traffic manager apparatus 14 is illustrated in FIGS. 1 and 2. The exemplary environment 10 includes a plurality of client computing devices 12(1)-12(n), a network traffic manager apparatus 14, the network traffic manager apparatus 14, and the plurality of hardware security server(s) 16(1)-16(n) which are coupled together by communication networks 30, although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here.

Referring more specifically to FIGS. 1 and 2, the network traffic manager apparatus 14 of the network traffic management system is coupled to the plurality of client computing devices 12(1)-12(n) through the communication network 30, although the plurality of client computing devices 12(1)-12(n) and network traffic manager apparatus 14 may be coupled together via other topologies. Additionally, the network traffic manager apparatus 14 is coupled to the network traffic manager apparatus 14 through the communication network 30, although the network traffic manager apparatus 14 and the network traffic manager apparatus 14 may be coupled together via other topologies.

As shown in FIG. 2, the network traffic manager apparatus 14 of the network traffic management system is coupled to a client computing devices 12(1), a recommended hardware security server 16(1), and a backup hardware security server 16 (2) through the communication network 30. In some examples, the network traffic manager apparatus 14 can use the recommended hardware security server 16(1) and the backup hardware security servers by directing traffic to both. The recommended hardware security server 16(1) and the backup hardware security server 16 (2) can be replicated and the keys for the recommended hardware security server 16(1) and the backup hardware security server 16 (2) can be replicated. This can allow the network traffic manager apparatus 14 to mask backend faults from the user infrastructure because it can ensure the recommended hardware security server 16(1) and the backup hardware security servers have copies of the keys, so that if one of those devices or services goes down, the network traffic manager apparatus 14 is able to select an alternate location where the critical information has been replicated.

The network traffic manager apparatus 14 assists with optimizing selection of a hardware security server as illustrated and described by way of the examples herein, although the network traffic manager apparatus 14 may perform other types and/or numbers of functions. The network traffic manager apparatus 14 includes processor or central processing unit (CPU), memory, and a communication system which are coupled together by a bus device although the network traffic manager apparatus 14 may comprise other types and numbers of elements in other configurations. In this example, the bus is a PCI Express bus in this example, although other bus types and links may be used.

The processors within the network traffic manager apparatus 14 may execute one or more computer-executable instructions stored in memory for the methods illustrated and described with reference to the examples herein, although the processor can execute other types and numbers of instructions and perform other types and numbers of operations. The processor 18 may comprise one or more central processing units ("CPUs") or general purpose processors with one or more processing cores, such as AMD® processor(s), although other types of processor(s) could be used (e.g., Intel®).

Figure 3:
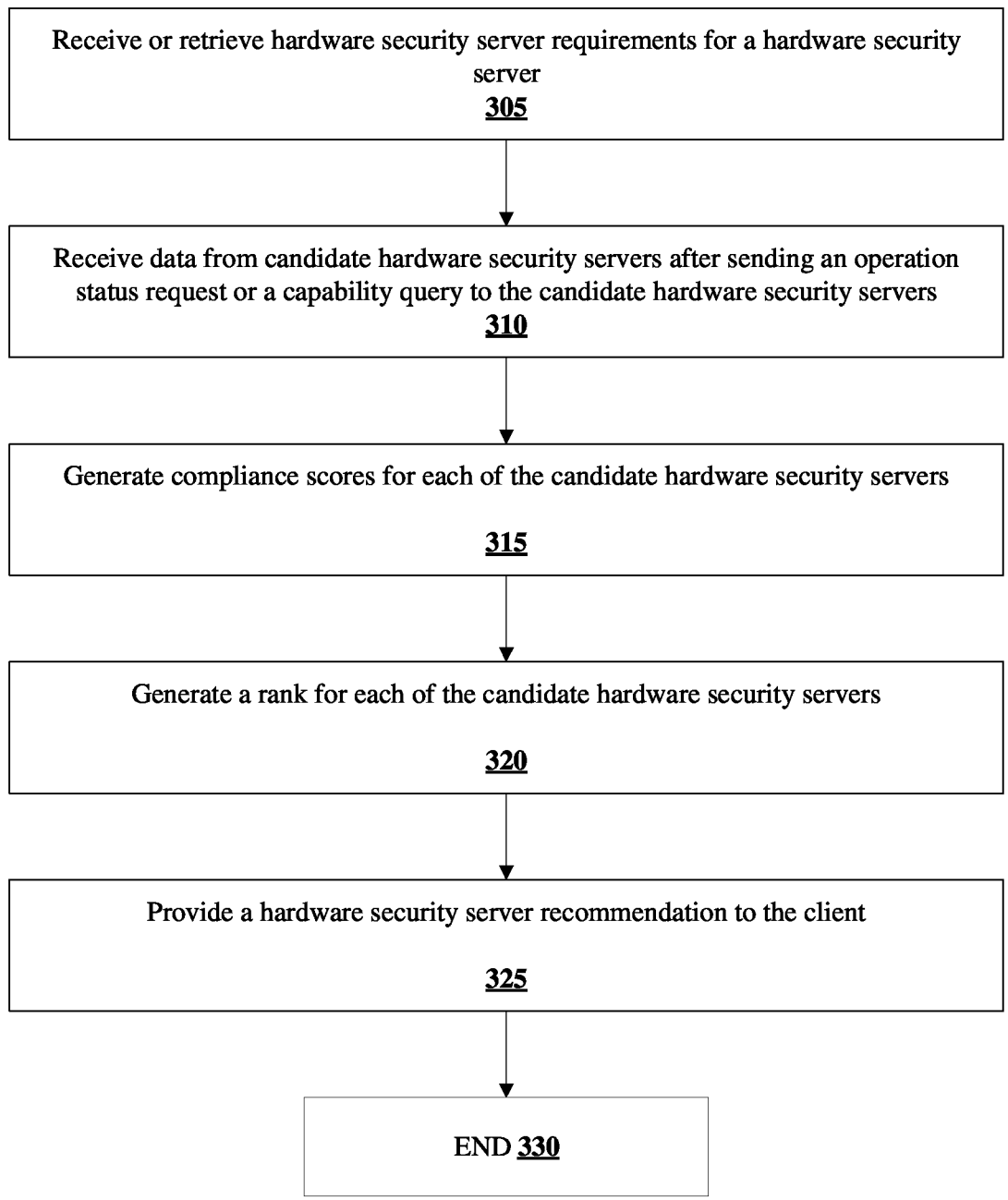
FIG. 3 is a flowchart of an exemplary method for optimizing selection of a hardware security server.
Figure 4:
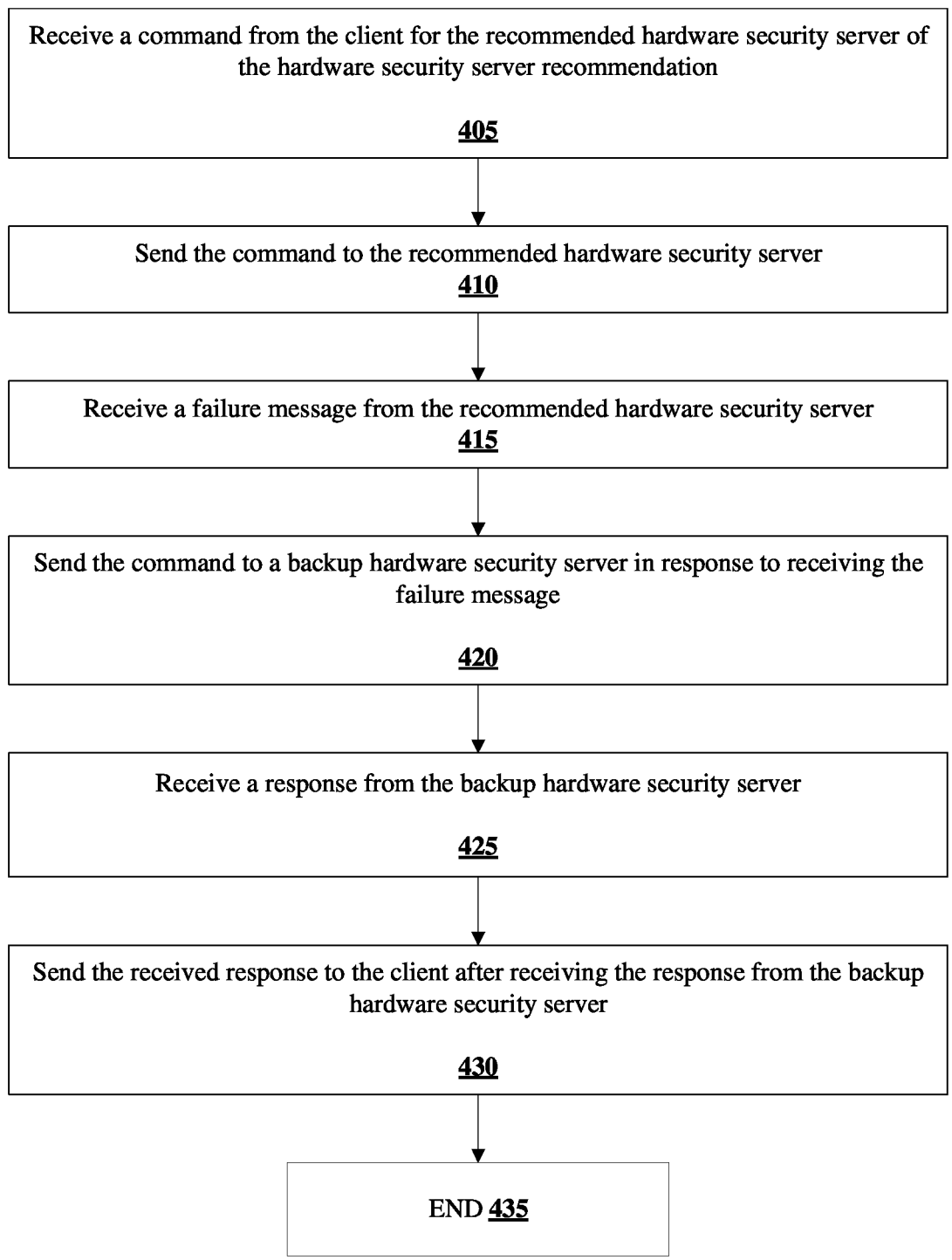
FIG. 4 is a flowchart of an exemplary method for optimizing selection of a backup hardware security server.

The memory within the network traffic manager apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the processor. The exemplary flowchart shown in FIGS. 3 and 4 are representative of example steps or actions of this technology that may be embodied or expressed as one or more non-transitory computer or machine readable instructions stored in the memory that may be executed by the processor and/or may be implemented by configured logic.

Accordingly, the memory of the network traffic manager apparatus 14 can store one or more applications that can include computer executable instructions that, when executed by the network traffic manager apparatus 14, causes the network traffic manager apparatus 14 to perform actions, such as to transmit, receive, or otherwise process messages, for example, and to perform other actions described and illustrated below with reference to FIGS. 3 and 4. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the network traffic manager apparatus 14 itself, may be located in virtual server(s) running in a cloud-based computing environment rather than being tied to one or more specific physical network computing devices. Also, the application(s) may be running in one or more virtual machines (VMs) executing on the network traffic manager apparatus 14. Additionally, in at least one of the various embodiments, virtual machine(s) running on the network traffic manager apparatus 14 may be managed or supervised by a hypervisor.

The communication system in the network traffic manager apparatus 14 is used to operatively couple and communicate between the network traffic manager apparatus 14, the plurality of client computing devices 12(1)-12(n), and the network traffic manager apparatus 14 which are all coupled together by communication network 30 such as one or more local area networks (LAN) and/or the wide area network (WAN), although other types and numbers of communication networks or systems with other types and numbers of connections and configurations to other devices and elements may be used. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus is a PCI Express bus in this example, although other bus types and links may be used.

Each of the plurality of client computing devices 12(1)-12(n) of the network traffic management system 10, include a central processing unit (CPU) or processor, a memory, input/display device interface, configurable logic device and an input/output system or I/O system, which are coupled together by a bus or other link. Additionally, the plurality of client computing devices 12(1)-12(n) can include any type of computing device that can receive, render, and facilitate user interaction, such as client computers, network computer, mobile computers, mobile phones, virtual machines (including cloud-based computer), or the like. Each of the plurality of client computing devices 12(1)-12(n) utilizes the network traffic manager apparatus 14 to conduct one or more operations with the network traffic manager apparatus 14, such as communicating with the plurality of hardware security server(s) 16(1)-16(n) via a communication network 30 between the network traffic manager apparatus 14 and the plurality of hardware security server(s) 16(1)-16(n), by way of example only, although other functions could also be performed as well.

The plurality of hardware security servers 16(1)-16(n) can include a plurality of hardware security modules. The plurality of hardware security servers 16(1)-16(n) can be computer hardware and/or software (e.g., a computing device) configured to store cryptographic keys, perform cryptographic operations (such as generating keys, encrypting data, and decrypting data), and enforce a security policy for using and/or accessing the cryptographic keys. The plurality of hardware security servers 16(1)-16(n) can include a physical enclosure that reduces a likelihood of observing and/or tampering with sensitive data, such as private keys of the plurality of hardware security servers 16(1)-16(n). The enclosure can cover potential electrical probe points and display visible damage if the enclosure is tampered with. The plurality of hardware security servers 16(1)-16(n) can have different APIs with different functions that perform the same task. The plurality of hardware security servers 16(1)-16(n) can also adhere to Public Key Cryptography Standards (PKCS). PKCS can be a class of public-key cryptography standards. PKCS #11 (also referred to as Cryptoki) can be a specific platform-independent API for interfacing to the plurality of hardware security servers 16(1)-16(n), which can define data types, functions, and other components that are available to applications that implement the PKCS #11 standard. The data types can represent an item, such as a cryptographic key, that is stored on the plurality of hardware security servers 16(1)-16(n). In some examples, the specific platform-independent API can implement different methods and functions of importing, exporting, encrypting, and decrypting the cryptographic keys.

The network traffic manager apparatus 14 can receive requests that are transmitted by the plurality of client computing devices 12(1)-12(n) using a communication network 30. The plurality of hardware security server(s) 16(1)-16(n) can perform operations such as load balancing, rate monitoring, caching, encryption/decryption, session management (including key generation), address translation, and/or access control, for example. The network traffic manager apparatus 14 can process the requests and perform various operations on behalf of the plurality of client computing devices 12(1)-12(n). The network traffic manager apparatus 14 can perform various cryptographic and communication operations to communicate with the plurality of hardware security server(s) 16(1)-16(n).

Generally, the plurality of hardware security server(s) 16(1)-16(n) can perform various computing tasks that are implemented using a computing environment. The computing environment can include computer hardware, computer software, and combinations thereof. As a specific example, the computing environment can include general-purpose and/or special-purpose processor(s), configurable and/or hard-wired electronic circuitry, a communications interface, and computer-readable memory for storing computer-executable instructions to enable the processor(s) to perform a given computing task. The logic to perform a given task can be specified within a single module or interspersed among multiple modules. As used herein, the terms "module" and "component" can refer to an implementation within one or more dedicated hardware devices or apparatus (e.g., computer(s)), and/or an implementation within software hosted by one or more hardware devices or apparatus that may be hosting one or more other software applications or implementations. Additionally, the network traffic manager apparatus 14 can include a cryptographic offload module that is used to offload cryptographic operations to the plurality of hardware security server(s) 16(1)-16(n).

The plurality of hardware security server(s) 16(1)-16(n) can be implemented using various different computer architectures. For example, a plurality of hardware security server(s) 16(1)-16(n) can be implemented as a plug-in circuit card that interfaces to an input/output or peripheral interface (such as Peripheral Component Interconnect Express (PCIe)) of a computer and can include a connector for connecting to a backplane or other connector of the computer. As another example, a plurality of hardware security server(s) 16(1)-16(n) can be implemented as a computer appliance that is connected over a computer network (a network-based plurality of hardware security server(s) 16(1)-16(n)). As another example, a plurality of hardware security server(s) 16(1)-16(n) can be implemented as a virtualized resource within a cloud-computing infrastructure (a cloud-based plurality of hardware security server(s) 16(1)-16(n)). The plurality of hardware security server(s) 16(1)-16(n) can have different storage capacities and/or acceleration capabilities. For example, a physical plurality of hardware security server(s) 16(1)-16(n) can be divided into multiple logical plurality of hardware security server(s) 16(1)-16(n), where each logical plurality of hardware security server(s) 16(1)-16(n) can have different capabilities and can be accessed using different account credentials. A logical plurality of hardware security server(s) 16(1)-16(n) can also be referred to as a partition or token of the physical plurality of hardware security server(s) 16(1)-16(n). Partitions of the plurality of hardware security server(s) 16(1)-16(n) can be isolated from each other so that keys and data on one partition are not visible from a different partition. Partitions can share hardware and other resources or the partitions can use specific unshared hardware and resources. A plurality of hardware security server(s) 16(1)-16(n) can use various storage technologies, such as random-access memory (RAM), non-volatile RAM, FLASH memory, a hard-disk drive, a solid-state drive, or other storage implementations. A plurality of hardware security server(s) 16(1)-16(n) can enable and/or deny access to a key according to a security policy. For example, the security policy can specify that a particular key can only be used and/or accessed when authorized account credentials are presented to the plurality of hardware security server(s) 16(1)-16(n).

In one example, the network traffic manager apparatus 14 can be a dedicated computing device including a processor and a computer-readable memory. The memory of the network traffic management apparatus 14 can store one or more applications that can include computer-executable instructions that, when executed by the network traffic manager apparatus 14, cause the network traffic manager apparatus 14 to perform actions, such as to transmit, receive, or otherwise process messages, for example, and to perform other actions such as, offloading cryptographic operations to the plurality of hardware security server(s) 16(1)-16(n) and accessing cryptographic keys stored on the plurality of hardware security server(s) 16(1)-16(n). The application(s) can be implemented as components of other applications. Further, the application(s) can be implemented as operating system extensions, plugins, or the like.

Thus, the technology disclosed herein is not to be construed as being limited to a single environment and other configurations and architectures are also envisaged. For example, the plurality of hardware security server(s) 16(1)-16(n) depicted in FIGS. 1 and 2 can operate within network traffic manager apparatus 14 rather than as a stand-alone server communicating with network traffic manager apparatus 14 via the communication network(s) 30. In this example the plurality of hardware security server(s) 16(1)-16(n) operate within the memory 20 of the network traffic manager apparatus 14.

While the network traffic manager apparatus 14 is illustrated in this example as including a single device, the network traffic manager apparatus 14 in other examples can include a plurality of devices or blades each with processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise network traffic manager apparatus 14 in other examples can be standalone devices or integrated with one or more other devices or applications, plurality of hardware security servers 16(1)-16(n) or, the network traffic manager apparatus 14, or the network traffic manager apparatus 14, or applications coupled to the communication network(s), for example. Moreover, one or more of the devices of the network traffic manager apparatus 14 in these examples can be in a same or a different communication network 30 including one or more public, private, or cloud networks, for example.

Although an exemplary network traffic management system 10 with the plurality of client computing devices 12(1)-12(n), the network traffic manager apparatus 14, the network traffic manager apparatus 14, and the plurality of hardware security server(s) 16(1)-16(n), and communication networks 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network traffic management system, such as the network traffic manager apparatus 14, the plurality of client computing devices 12(1)-12(n), the network traffic manager apparatus 14, and the plurality of hardware security server(s) 16(1)-16(n), for example, may be configured to operate as virtual instances on the same physical machine. In other words, one or more of network traffic manager apparatus 14, the plurality of client computing devices 12(1)-12(n), the network traffic manager apparatus 14, or the plurality of hardware security server(s) 16(1)-16(n) illustrated in FIG. 1 may operate on the same physical device rather than as separate devices communicating through a network as depicted in FIG. 1. There may be more or fewer plurality of client computing devices 12(1)-12(n), network traffic manager apparatus 14, the network traffic manager apparatus 14, or the plurality of hardware security server(s) 16(1)-16(n) than depicted in FIG. 1. The plurality of client computing devices 12(1)-12(n), the network traffic manager apparatus 14, the plurality of hardware security servers 16(1)-16(n) could be implemented as applications on network traffic manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An example of a method for optimizing selection from a plurality of hardware security servers will now be described with reference to FIGS. 1-5. First in step 305, the network traffic manager apparatus 14 receives or retrieves hardware security server requirements for a hardware security server as illustrated in FIG. 3. The hardware security server requirements may be built into the hardware security server via canned defaults or other known methods in the art. In some examples, the hardware security server requirements can comprise one or more server operation rules such as meeting a client location, an operational data range for the hardware security server, an availability status indicator for the hardware security server, a required response time, a transactions per second per load data requirement, and combinations thereof. The operational data range can be a usage price for the hardware security server 16(1). A client 12(1) can need a hardware security server 16(1) that meets multiple hardware security server requirements. The client 12(1) may require the hardware security server 16(1) to be in a specific location of where the client is located or in a range close to the client location. The client 12(1) can have a budget for the usage price of the needed hardware security server 16(1), and in response can have a usage price range for the hardware security server 16(1). The client 12(1) may also require the hardware security server 16(1) to be available certain days or times of the week, month, or year. In some embodiments, the client(1) may have a requirement for a specific response time or a range for an acceptable response time of the hardware security server 16(1). The hardware security server 16(1) may need to process a certain number of transactions per second per load data for the client(1) as well. The requirements may include verifying if the hardware security server 16(1) meets regulatory compliance requirements. To verify if the hardware security server 16(1) is compliant, a request may be sent to the hardware security server 16(1) to request certification of the hardware security server 16(1) for authentication and verification purposes. Regulatory compliance requirements can include FIPS-140 requirements. In some embodiments, the network traffic manager can retrieve a cloud provider's preferences for the requirements of the hardware security server 16(1). Additionally, the requirements can include comparing the persistence of the plurality of hardware security servers 16(1)-16(n). By example, each of the hardware security servers 16(1)-16(n) can conduct key operations like generating a random number or creating a key inside of the hardware security servers 16(1)-16(n), and so it may be important to ensure there is persistence between the client 12(1) and the hardware security servers 16(1)-16(n). In other examples, the requirements for the hardware security servers 16(1)-16(n) can include an ability to support elliptic curve cryptography. A requirement can also include the hardware security server 16(1) having the capability to support ECC or other desired cryptographic algorithms as an aspect of the logic of the hardware security servers 16(1).

In step 310, the network traffic manager apparatus 14 can receive data from candidate hardware security servers after sending an operation status request or a capability query to the candidate hardware security servers in response to receiving the hardware security server requirements. Some of the criteria in the hardware security requirements can be performance data or other runtime observational data. Some of the data received can come from responses from a status request to the candidate hardware security servers. Capabilities queries can be sent to the candidate hardware security servers as well. The hardware security server requirements can comprise one or more server operation rules. The operation status request can comprise a request for the hardware security server location, operational data, availability, actual response time, transactions per second per load ability, persistence elliptic curve cryptography support capabilities, and other hardware security servers 16(1) capabilities known in the art. In this example, as illustrated in FIG. 1, the network traffic manager apparatus 14 can operate as a proxy between the plurality of client computing devices 12(1)-12(n) and the plurality of hardware security servers 16(1)-16(n). The network traffic manager apparatus 14 can allow a client 12(1) to interact with a single interface while masking underlying implementation details of the plurality of hardware security servers 16(1)-16(n). A proxy is an agent that can be situated in a path of communication between a client (e.g., the plurality of client computing devices 12(1)-12(n)) and a server (e.g., the plurality of hardware security servers 16(1)-16(n)) that can intercept communications (e.g., network packets, frames, datagrams, and messages) between the plurality of client computing devices 12(1)-12(n) and the plurality of hardware security servers 16(1)-16(n). In some examples, the network traffic manager apparatus 14 can perform security and/or routing functions of the plurality of client computing devices 12(1)-12(n), such as performing encryption and/or decryption operations for traffic flowing between the plurality of client computing devices 12(1)-12(n) and the plurality of hardware security servers 16(1)-16(n). Specifically, the network traffic manager apparatus 14 can act on behalf of the plurality of hardware security servers 16(1)-16(n), such as by encrypting traffic sent by the plurality of hardware security servers 16(1)-16(n), decrypting traffic that is destined for the plurality of hardware security servers 16(1)-16(n), and performing operations of a handshake for exchanging cryptographic information with the plurality of client computing devices 12(1)-12(n). Additionally, the network traffic manager apparatus 14 can send requests to the plurality of hardware security servers 16(1)-16(n) to receive a response including the specifications of the plurality of hardware security servers 16(1)-16(n), as outlined above.

In step 315, the network traffic manager apparatus 14 can generate compliance scores for each of the candidate hardware security servers 16(1)-16(n). In order to generate the compliance scores, the network traffic manager apparatus 14 evaluates each of the candidate hardware security servers be determining whether different features of the candidate hardware security servers complies with the hardware security server requirements. Various determinations that can be conducted by the network traffic manager apparatus 14 will now be described. In some examples, the network traffic manager apparatus 14 can determine whether the operation status responses complies with the hardware security server requirements based on the received operation status responses. In some embodiments, the hardware security servers can be monitored passively by observing the hardware security servers. In some embodiments, the performance metrics of the hardware security servers can be used to determine if the operation of the hardware security servers comply with the hardware security server requirements as well. The hardware security requirements, as outlined above can comprise of one or more operation rules or requirements. For example, the recommended hardware security server 16(1) may need to be in the client location, be within an operational data range or usage price range, be certified, and meet the availability requirements of the client. If the operation status responses complies with the hardware security server requirements, the network traffic manager 14 assigns a high score to the candidate hardware security server 16(1). If the operation status responses does not comply with the hardware security server requirements, the network traffic manager 14 assigns a low score to the candidate hardware security server 16(1). These scores are later used to generate a rank for each of the candidate hardware security servers 16(1)-16(n). In one embodiment, the network traffic manager apparatus 14 determines whether the hardware security server location of the candidate hardware security server 16(1) is the client location or within a determined range of the client location. This determination can be used to generate a score for this particular requirement, which can later be combined with the assigned score for each requirement for the network traffic manager apparatus 14 to generate a ranking. A high score may be assigned if the hardware security server location of the candidate hardware security server 16(1) is the same client location. If the hardware security server location of the candidate hardware security server 16(1) is not the same hardware security server location not the same client location but is within a determined range of the client location, a medium score may be assigned. The determined range of the hardware security server location may be received from the client 12(1) as a requirement. The determined range can be set by the network traffic manager apparatus 14 with a default value. If the hardware security server location of the candidate hardware security server 16(1) is not within the determined range of the client 12(1), a low score can be assigned to this requirement to calculate or generate the ranking. In some embodiments, if the network traffic manager apparatus 14 determines that the hardware security server location of the candidate hardware security server 16(1) is not within the determined range of the client 12(1), the candidate hardware security server 16(1) can be eliminated as a possible recommendation for the hardware security server 16(1). In some embodiments, the network traffic manager apparatus 14 can determine if the candidate hardware security server 16(1) meets other requirements as well. In some embodiments if the network traffic manager apparatus 14 determines that the actual response time of the candidate hardware security server 16(1) is not within a determined range of a required response time, a low score can be assigned to this requirement.

In some embodiments if the network traffic manager apparatus 14 determines that the actual response time of the candidate hardware security server 16(1) is within a determined range of a required response time, a high score can be assigned to this requirement. In some embodiments if the network traffic manager apparatus 14 determines that the transactions per second per load ability of the candidate hardware security server 16(1) meets the transactions per second per load requirement requested by the client 12(1), then a high score can be assigned. A high score can also be assigned if the transactions per second per load ability of the candidate hardware security server 16(1) is within a determined range of the transactions per second per load requirement requested by the client 12(1). A low score can also be assigned if the transactions per second per load ability of the candidate hardware security server 16(1) is not within a determined range of the transactions per second per load requirement requested by the client 12(1). A high score can also be assigned to a requirement if the client 12(1) requests hardware security server 16(1) have a certain capability and the candidate hardware security server 16(1) has the requested capability. For example, if the client 12(1) requests the recommended hardware security server 16(1) have persistence elliptic curve cryptography support, and the candidate hardware security server 16(1) supports persistence elliptic curve cryptography a high score can be assigned. If the candidate hardware security server 16(1) does not support persistence elliptic curve cryptography a high score can be assigned. Other features known in the art for hardware security server 16(1) can be assigned high, medium, or low scores depending on whether the candidate hardware security server 16(1) has the requested feature. The scores can also vary in magnitude and do not have to be high, medium, and low and can be scored differently.

In some embodiments, the network traffic manager apparatus 14 determines whether the operational data of the candidate hardware security server 16(1) is in the operational data range of the hardware security server requirements. If the operational data of the candidate hardware security server 16(1) is within the operational data range of the hardware security server requirements received from the client 12(1), a high score can be assigned for this requirement. A higher score can be assigned if the operational data of the candidate hardware security server 16(1) is within the operational data range of the hardware security server requirements received from the client 12(1) but on the lower range. A medium score can be assigned if the operational data of the candidate hardware security server 16(1) is within the operational data range of the hardware security server requirements received from the client 12(1) but on the higher range. A low score can be assigned if the operational data of the candidate hardware security server 16(1) is not within the operational data range of the hardware security server requirements received from the client 12(1). In some embodiments, if the network traffic manager apparatus 14 determines that the operational data of the candidate hardware security server 16(1) is not within the operational data range of the hardware security server requirements received from the client 12(1), the candidate hardware security server 16(1) can be eliminated as a possible recommendation for the hardware security server 16(1).

In some embodiments, the network traffic manager apparatus 14 determines whether the availability of the candidate hardware security server 16(1) includes the availability status indicator for the hardware security server 16(1). A high score can be assigned if the network traffic manager apparatus 14 determines that the availability of the candidate hardware security server 16(1) includes the availability status indicator for the hardware security server 16(1). A low score can be assigned if the network traffic manager apparatus 14 determines that the availability of the candidate hardware security server 16(1) does not include the availability status indicator for the hardware security server 16(1). In some embodiments, if the network traffic manager apparatus 14 determines that the availability of the candidate hardware security server 16(1) does not include the availability status indicator for the hardware security server 16(1), the candidate hardware security server 16(1) can be eliminated as a possible recommendation for the hardware security server 16(1).

In step 320, the network traffic manager apparatus 14 generates a rank for each of the candidate hardware security servers 16(1)-16(n). In other words, if the network traffic manager apparatus 14 in step 325 determines that a candidate hardware security server 16(1) is compliant with the hardware security server requirements, then the candidate hardware security server 16(1) is ranked against other determined compliant candidate hardware security servers 16(1)-16(n). The generated rank can also be based on the determinations outlined above, such as location, availability, usage price or operational data range, availability, and a compliance determination. In some embodiments, a command can be sent to each of the candidate hardware security servers 16(1)-16(n) to retrieve certification from each of the candidate hardware security servers 16(1)-16(n). The received certifications can be compared against a determined standard to verify if the certifications are authentic and valid. The information on the certification itself can be compared to a determined standard to verify if the certificate meets the minimum standard for the hardware security server 16(1). The generated ranks can also be based on comparing the specification of the candidate hardware security servers 16(1)-16(n) to the cloud provider's preferences for the requirements of the hardware security server 16(1).

Each hardware security server requirement can be given a determined weight. In some embodiments, a score can be assigned to each of the candidate hardware security servers 16(1)-16(n) based on the determinations and weight of the different requirements. For example, a score can be given to each requirement and then the scores for the requirements can be combined using the determined weight for each requirement. In other embodiments, the requirements can serve as a baseline requirement, and the candidate hardware security servers 16(1)-16(n) can be eliminated from possible selection as the recommended hardware security servers 16(1) if any of the specifications of the candidate hardware security servers 16(1)-16(n) do not meet the requirements. It is understood in the art that other methods of ranking and scoring can be used to generate the generated rank of each of the candidate hardware security servers 16(1)-16(n).

In step 325, the network traffic manager apparatus 14 provides a hardware security server recommendation and the ranked candidate hardware security servers 16(1)-16(n) to the client and the exemplary flow ends at step 330. The hardware security server recommendation can be generated based on the generated ranks of the candidate hardware security servers with the determination indicating compliance. In some embodiments, after a hardware security server recommendation is sent to the client, the network traffic manager apparatus 14 can route new sessions and requests for any operations from the client 12(1) to the recommended hardware security server 16(1). By example, the hardware security server recommendation can comprise recommending multiple hardware security servers 16(1)-16(n). In a multi-tenancy scenario, the network traffic manager apparatus 14 can load balance operations from the client 12(1) between the multiple hardware security servers 16(1)-16(n) to maximize the capacity of the multiple hardware security servers 16(1)-16(n) as well as reducing overall costs.

Figure 5:
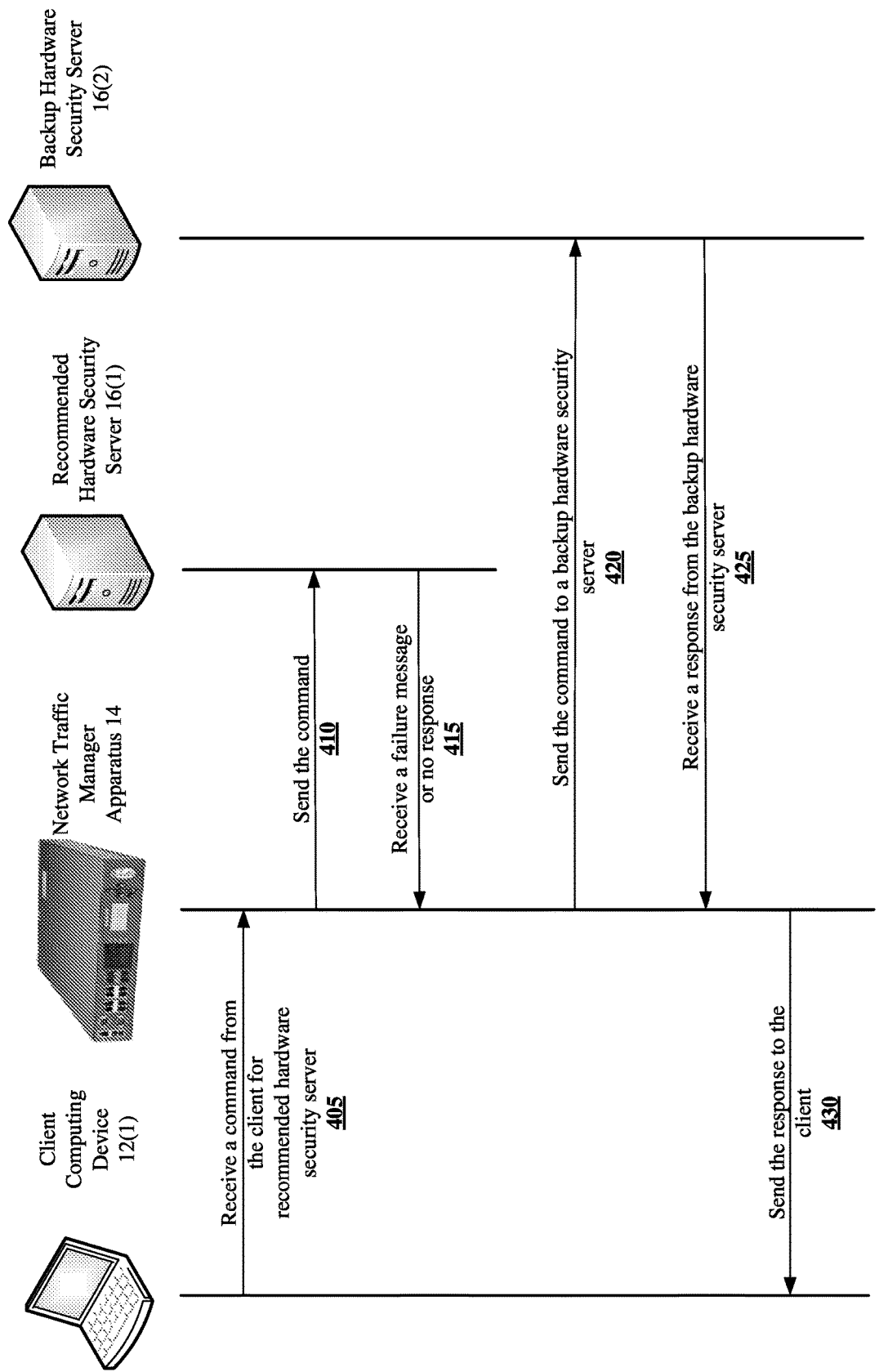
FIG. 5 is an exemplary sequence flow diagram illustrating the method for optimizing selection of a hardware security server.

An example method for selecting backup hardware security servers from a plurality of hardware security servers 16(1)-16(n) will now be described with reference to FIGS. 2, 4, and 5. First in step 405, the network traffic manager apparatus 14 receives a command from the client 12(1) for the recommended hardware security server 16(1) of the hardware security server recommendation. In step 410, the network traffic manager apparatus 14 sends the command to the recommended hardware security serve 16(1). In step 415, the network traffic manager apparatus 14 receives a failure message as a response from the recommended hardware security serve 16(1). The recommended hardware security server 16(1) can become unavailable. In some embodiments, a failure message is not received from the recommended hardware security server 16(1). A lack of response from the recommended hardware security server can also indicate a failure of the recommended hardware security server. Instead, the client 12(1) sends a command to be processed directly by the backup hardware security server 16 (2) without receiving a failure message beforehand.

In step 420, the network traffic manager apparatus 14 sends the command to a backup hardware security server 16 (2) in response to receiving the failure message. The backup hardware security server 16 (2) can be selected from the candidate hardware security servers 16(1)-16(n). A candidate hardware security server 16(1) not recommended as the hardware security server 16(1) but with a generated rank that is high can be selected as the backup hardware security server 16 (2). In some embodiments, multiple backup hardware security servers can be selected.

In step 425, the network traffic manager apparatus 14 receives a response from the backup hardware security serve 16 (2). In step 430, the network traffic manager apparatus 14 sends the received response from the backup hardware security serve 16 (2) to the client 12(1) and the exemplary flow ends at step 435. As shown in this example, having the network traffic manager apparatus 14 select backup hardware security servers can facilitate high availability. By selecting backup hardware security servers, the network traffic manager apparatus 14 can orchestrate key migration or synchronization between the recommended hardware security server 16(1) and the backup hardware security servers.

In some examples, the network traffic manager apparatus 14 can use the recommended hardware security server 16(1) and the backup hardware security servers by directing traffic to both. The recommended hardware security server 16(1) and the backup hardware security server 16 (2) can be replicated and the keys for the recommended hardware security server 16(1) and the backup hardware security server 16 (2) can be replicated. This can allow the network traffic manager apparatus 14 to mask backend faults from the user infrastructure because it can ensure the recommended hardware security server 16(1) and the backup hardware security servers have copies of the keys, so that if one of those devices or services goes down, the network traffic manager apparatus 14 is able to select an alternate location where the critical information has been replicated. In some examples, the backup hardware security servers can be selected from different areas in the same cloud or from different clouds to lower the risk of key loss due to the outage of cloud providers. In other examples, the recommended hardware security server 16(1) may be already purchased by the user. The user can desire using the recommended hardware security server 16(1) to a certain level and then cloud bursting to a different one of the plurality of hardware security servers 16(1)-16(n). In this example, the different one of the plurality of hardware security servers 16(1)-16(n) can help reduce cost and maximize capacity by allowing the user infrastructure to use the recommended hardware security server 16(1) already purchased and then cloud bursting to the backup hardware security servers that may provide a different capability. For example, the different capability could include a different price structure such as a service that charges per transaction.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly

What is claimed is:

1. A method for optimizing selection from hardware security servers, the method implemented by a cloud service or a network traffic management system comprising network traffic apparatuses, client devices, or server devices, the method comprising:
 receiving data from candidate hardware security servers after sending an operation status request or a capability query to the candidate hardware security servers, wherein the data comprises a response from the candidate hardware security servers, performance data, or runtime observational data of the candidate hardware security servers, wherein the data is received subsequent to receiving or retrieving hardware security server requirements for a hardware security server recommendation, and wherein the hardware security server requirements comprise one or more server operation rules;
 generating compliance scores for the candidate hardware security servers based on hardware security server requirements, built-in hardware security server requirements, and received data from the candidate hardware security servers;
 generating a rank for the candidate hardware security servers based on the compliance scores of the candidate hardware security servers; and
 providing the hardware security server recommendation for one of the candidate hardware security servers to the client based on the generated rank of the candidate hardware security servers with compliance scores above a predetermined threshold.

2. The method as set forth in claim 1, wherein the generating the compliance score of the candidate hardware security servers further comprises:
 determining a proximity match within a set range from a client location based on the location of each of the candidate hardware security servers;
 determining an operational match of each of the candidate hardware security server based on an operational data range in the hardware security server requirements; and
 determining an availability of each of the candidate hardware security servers based on an availability status indicator in the hardware security server requirements.

3. The method as set forth in claim 1, further comprising:
 observing metrics for each of the candidate hardware security servers, wherein the observed metrics comprise a response time or a transactions per second per load data for each of the candidate hardware security servers; and
 updating the ranking based on the observed metrics for each of the candidate hardware security servers.

4. The method as set forth in claim 3, further comprising:
 selecting one or more backup hardware security servers from the candidate hardware security servers based on the generated rank of each of the candidate hardware security servers.

5. The method as set forth in claim 4, further comprising:
 receiving a command from the client for the recommended hardware security server of the hardware security server recommendation;
 sending the command to the recommended hardware security server;
 sending the command to a backup hardware security server in response to receiving a failure message or not receiving a response from the recommended hardware security server, wherein the backup hardware security server is one of the selected backup hardware security servers; and
 sending a response to the client, wherein the response is generated and received by the backup hardware security server after sending the command to the backup hardware security server.

6. A non-transitory computer readable medium having stored thereon instructions for optimizing selection from hardware security servers comprising executable code which when executed by processors, causes the processors to:
 receive data from candidate hardware security servers after sending an operation status request or a capability query to the candidate hardware security servers, wherein the data comprises a response from the candidate hardware security servers, performance data, or runtime observational data of the candidate hardware security servers, wherein the data is received subsequent to receiving or retrieving hardware security server requirements for a hardware security server recommendation, and wherein the hardware security server requirements comprise one or more server operation rules;
 generate compliance scores for the candidate hardware security servers based on hardware security server requirements, built-in hardware security server requirements, and received data from the candidate hardware security servers;
 generate a rank for the candidate hardware security servers based on the compliance scores of the candidate hardware security servers; and
 provide the hardware security server recommendation for one of the candidate hardware security servers to the client based on the generated rank of the candidate hardware security servers with compliance scores above a predetermined threshold.

7. The medium as set forth in claim 6, wherein the executable code which when executed by the processors, further causes the processors to:
 determine a proximity match within a set range from a client location based on the location of each of the candidate hardware security servers;
 determine an operational match of each of the candidate hardware security server based on an operational data range in the hardware security server requirements; and
 determine an availability of each of the candidate hardware security servers based on an availability status indicator in the hardware security server requirements.

8. The medium as set forth in claim 6, wherein the executable code which when executed by the processors, further causes the processors to:
 observe metrics for each of the candidate hardware security servers, wherein the observed metrics comprise a response time or a transactions per second per load data for each of the candidate hardware security servers; and
 update the ranking based on the observed metrics for each of the candidate hardware security servers.

9. The medium as set forth in claim 8, wherein the executable code which when executed by the processors, further causes the processors to:

select one or more backup hardware security servers from the candidate hardware security servers based on the generated rank of each of the candidate hardware security servers.

10. The medium as set forth in claim 9, wherein the executable code which when executed by the processors, further causes the processors to:

receive a command from the client for the recommended hardware security server of the hardware security server recommendation;

send the command to the recommended hardware security server;

send the command to a backup hardware security server in response to receiving a failure message or not receiving a response from the recommended hardware security server, wherein the backup hardware security server is one of the selected backup hardware security servers; and send a response to the client, wherein the response is generated and received by the backup hardware security server after sending the command to the backup hardware security server.

11. A network traffic manager apparatus, comprising memory comprising programmed instructions stored in the memory and processors configured to be capable of executing the programmed instructions stored in the memory to:

receive data from candidate hardware security servers after sending an operation status request or a capability query to the candidate hardware security servers, wherein the data comprises a response from the candidate hardware security servers, performance data, or runtime observational data of the candidate hardware security servers, wherein the data is received subsequent to receiving or retrieving hardware security server requirements for a hardware security server recommendation, and wherein the hardware security server requirements comprise one or more server operation rules;

generate compliance scores for the candidate hardware security servers based on hardware security server requirements, built-in hardware security server requirements, and received data from the candidate hardware security servers;

generate a rank for the candidate hardware security servers based on the compliance scores of the candidate hardware security servers; and provide the hardware security server recommendation for one of the candidate hardware security servers to the client based on the generated rank of the candidate hardware security servers with compliance scores above a predetermined threshold.

12. The device as set forth in claim 11, wherein the processors are further configured to be capable of executing the programmed instructions stored in the memory to:

determine a proximity match within a set range from a client location based on the location of each of the candidate hardware security servers;

determine an operational match of each of the candidate hardware security server based on an operational data range in the hardware security server requirements; and determine an availability of each of the candidate hardware security servers based on an availability status indicator in the hardware security server requirements.

13. The device as set forth in claim 11, wherein the processors are further configured to be capable of executing the programmed instructions stored in the memory to:

observe metrics for each of the candidate hardware security servers, wherein the observed metrics comprise a response time or a transactions per second per load data for each of the candidate hardware security servers; and update the ranking based on the observed metrics for each of the candidate hardware security servers.

14. The device as set forth in claim 13, wherein the processors are further configured to be capable of executing the programmed instructions stored in the memory to:

select one or more backup hardware security servers from the candidate hardware security servers based on the generated rank of each of the candidate hardware security servers.

15. The device as set forth in claim 14, wherein the processors are further configured to be capable of executing the programmed instructions stored in the memory to:

receive a command from the client for the recommended hardware security server of the hardware security server recommendation;

send the command to the recommended hardware security server;

send the command to a backup hardware security server in response to receiving a failure message or not receiving a response from the recommended hardware security server, wherein the backup hardware security server is one of the selected backup hardware security servers; and send a response to the client, wherein the response is generated and received by the backup hardware security server after sending the command to the backup hardware security server.

16. A network traffic management system, comprising traffic management apparatuses, client devices, or server devices, the network traffic management system comprising memory comprising programmed instructions stored thereon and processors configured to be capable of executing the stored programmed instructions to:

receive data from candidate hardware security servers after sending an operation status request or a capability query to the candidate hardware security servers, wherein the data comprises a response from the candidate hardware security servers, performance data, or runtime observational data of the candidate hardware security servers, wherein the data is received subsequent to receiving or retrieving hardware security server requirements for a hardware security server recommendation, and wherein the hardware security server requirements comprise one or more server operation rules;

generate compliance scores for the candidate hardware security servers based on hardware security server requirements, built-in hardware security server requirements, and received data from the candidate hardware security servers;

generate a rank for the candidate hardware security servers based on the compliance scores of the candidate hardware security servers; and provide the hardware security server recommendation for one of the candidate hardware security servers to the client based on the generated rank of the candidate hardware security servers with compliance scores above a predetermined threshold.

17. The network traffic management system as set forth in claim 16, wherein the processors are further configured to be capable of executing the programmed instructions stored in the memory to:

determine a proximity match within a set range from a client location based on the location of each of the candidate hardware security servers;

determine an operational match of each of the candidate hardware security server based on an operational data range in the hardware security server requirements; and determine an availability of each of the candidate hardware security servers based on an availability status indicator in the hardware security server requirements.

18. The network traffic management system as set forth in claim 16, wherein the processors are further configured to be capable of executing the programmed instructions stored in the memory to:

observe metrics for each of the candidate hardware security servers, wherein the observed metrics comprise a response time or a transactions per second per load data for each of the candidate hardware security servers; and update the ranking based on the observed metrics for each of the candidate hardware security servers.

19. The network traffic management system as set forth in claim 18, wherein the processors are further configured to be capable of executing the programmed instructions stored in the memory to:

select one or more backup hardware security servers from the candidate hardware security servers based on the generated rank of each of the candidate hardware security servers.

20. The network traffic management system as set forth in claim 19, wherein the processors are further configured to be capable of executing the programmed instructions stored in the memory to:

receive a command from the client for the recommended hardware security server of the hardware security server recommendation;

send the command to the recommended hardware security server;

send the command to a backup hardware security server in response to receiving a failure message or not receiving a response from the recommended hardware security server, wherein the backup hardware security server is one of the selected backup hardware security servers; and send a response to the client, wherein the response is generated and received by the backup hardware security server after sending the command to the backup hardware security server.

* * * * *